United States Patent [19]
Froeschke

[11] Patent Number: 5,344,087
[45] Date of Patent: Sep. 6, 1994

[54] DEVICE FOR PRODUCING GRANULATE

[75] Inventor: Reinhard Froeschke, Weinstadt-Beutelsbach, Fed. Rep. of Germany

[73] Assignee: Santrade Ltd., Luzern, Switzerland

[21] Appl. No.: 162,603

[22] Filed: Dec. 7, 1993

[30] Foreign Application Priority Data

Dec. 24, 1992 [DE]  Fed. Rep. of Germany ........ 4244035

[51] Int. Cl.[5] ............................................... B01J 2/20
[52] U.S. Cl. .......................................... 241/91; 241/15; 384/481
[58] Field of Search ...................... 241/91, 93, 228, 87, 241/15; 384/481; 277/38

[56] References Cited
U.S. PATENT DOCUMENTS

| | | | |
|---|---|---|---|
| 1,734,497 | 11/1929 | Limpert | 384/481 |
| 1,906,734 | 5/1933 | Bortom | 241/91 |
| 2,721,035 | 10/1955 | Lankford et al. | 241/91 X |
| 2,942,638 | 6/1960 | Mauari | 241/91 X |
| 4,707,150 | 11/1987 | Graham | 384/481 |
| 4,881,829 | 11/1989 | Koelscm | 384/481 |

OTHER PUBLICATIONS

Brochure: Sandvik Rotoform Verfahren, Prospectus Sandvik Process Systems GmbH, PS-500 GER3.921.

*Primary Examiner*—Douglas D. Watts
*Attorney, Agent, or Firm*—Burns, Doane, Swecker & Mathis

[57] ABSTRACT

A machine for producing granulate from meltable compounds comprises a stationary inner drum and a rotary outer drum mounted on the inner drum. Melted compound contained within the inner drum drips onto a cooling belt when openings in the outer and inner drums become vertically aligned. A bearing/sealing assembly is disposed at each end of the inner drum. Each bearing/sealing assembly includes a bearing for rotatably supporting the outer drum, and a seal for resisting the leakage of particles beyond the drums. An annulus surrounds the seal and includes a downwardly directed discharge opening enabling particles which have leaked past the seal to fall from the assembly without reaching and fouling the bearing.

8 Claims, 2 Drawing Sheets

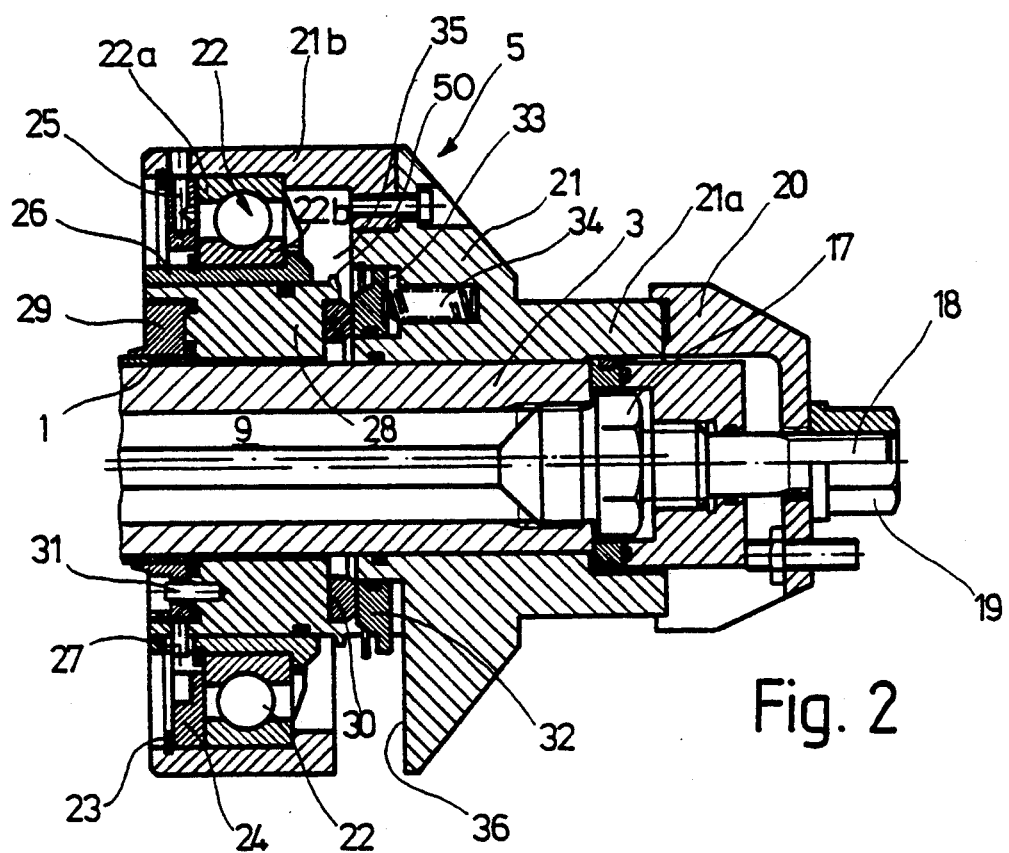
Fig. 2
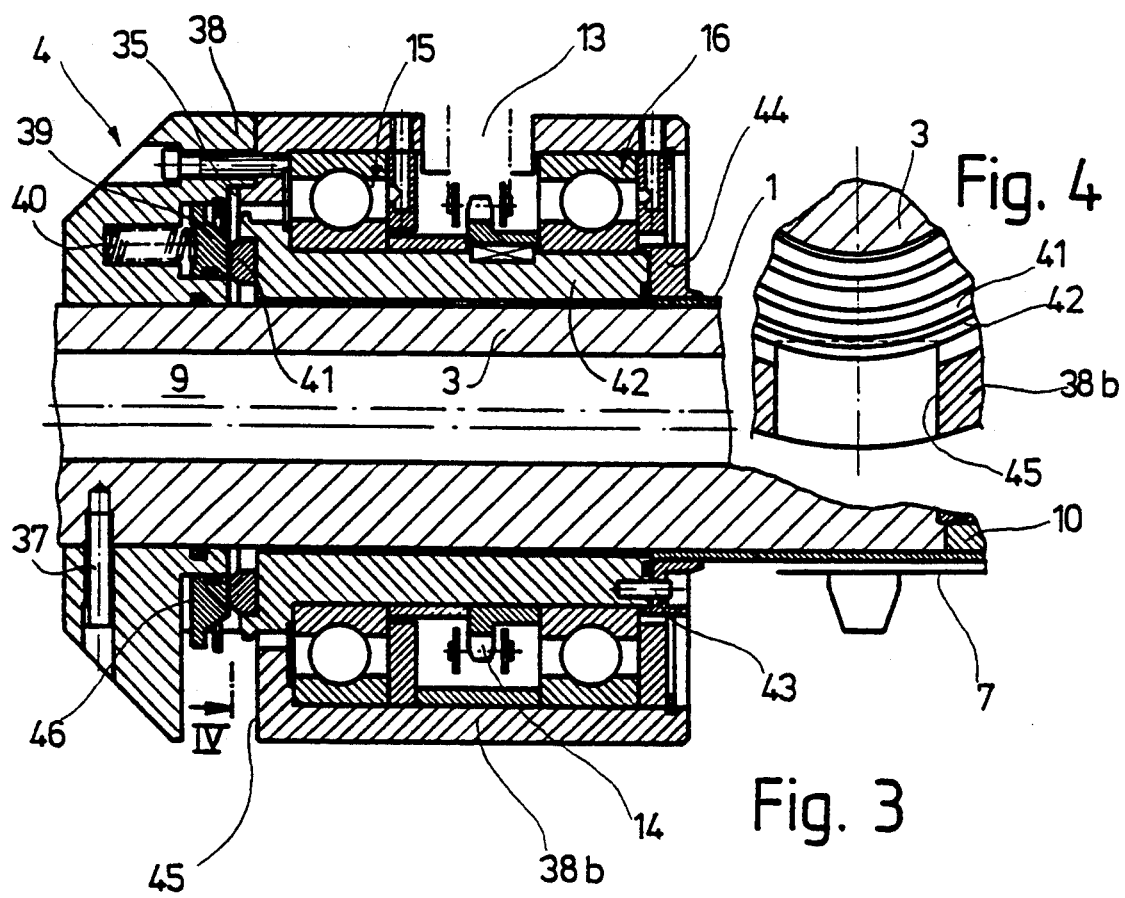
Fig. 4
Fig. 3

DEVICE FOR PRODUCING GRANULATE

BACKGROUND OF THE INVENTION

The invention relates to a device for producing granulate from meltable compounds.

Such a device typically comprises an inner cylindrical drum at least one end of which is mounted stationarily to a support, and is fed internally with the compound to be granulated. The inner drum is provided with at least one downwardly directed row of openings. A cylindrical outer drum rests on the circumference of the inner drum so as to rotate in anti-friction bearings. The outer drum is provided with openings distributed over its entire circumference and which are brought cyclically into alignment with the openings of the inner drum. An axial seal is provided between the ends of the rotating outer drum and the stationary parts which retain the bearings.

Such a device is known for implementing the so-called rotoforming process (see prospectus of the Sandvik rotoforming process of the Sandvik Process Systems GmbH in 7012 Fellbach, Imprint: PS 500 GER 3.921). In these prior art designs an end flange of the outer drum is connected to a bearing ring against rotation relative thereto, which serves to brace the anti-friction bearing, whose inner race is connected rigidly to a stationary inner drum. An axial seal between the flange of the outer drum and the stationary inner bearing member is obtained by means of a first sealing ring connected to the flange of the outer drum, and a second sealing ring which interacts with the first sealing ring and is attached to the stationary bearing body. The second sealing ring is pressed axially by means of a set of cup springs against the first sealing ring. In these designs it can happen that product compounds, in particular if they have relatively low viscosity, can leak past the space between the stationary inner drum and the rotating outer drum at leaky points of the seal and flow into the region of the bearing, and can solidify there and lead to a malfunction, possibly even to intermittent stoppage of the production.

SUMMARY OF THE INVENTION

Therefore, the present invention is based on the desire to design a device to produce granulate of the aforementioned kind in such a manner that the risk of impairing the rotary mounting due to product leakage at the seal is reliably avoided. To solve this problem it is proposed that the bearing outer ring of the anti-friction bearing be fastened in a bell, which overlies the bearing in the direction of the rotating outer drum and which sits rigidly on the inner drum, that the inner race of the bearing sits on a supporting ring, which is connected to the rotating outer drum in the circumferential direction and which rests sealingly against the inner wall of the bell, and that the annulus formed in the bell in the region of the seal exhibits an outlet that is open at the bottom.

With this design the advantage is achieved that material, which may or may not leak past the seal, can drip down through the downwardly directing outlet in the bell and thus is prevented from contaminating the bearing. Another important advantage of the bearing of the invention lies in the fact that the outwardly exposed part of the bearing arrangement is stationary; and, therefore, can be regarded from the point of view of accident protection as a safety cover for the rotating parts that lie exclusively inside.

The new design also exhibits the advantage that now the seal can be constructed in a relatively simple manner from a graphite ring, rigidly embedded in the face of the supporting ring, and from a counter-ring, which sits in the inner front wall of the stationary bell and which can be biased in a well-known manner by means of compression springs, which are distributed over the circumference of the stationary bell, against the graphite ring. The arrangement of a set of cup springs, which presses on a front-sided hood of the mounting for sealing purposes, is superfluous.

In addition, it can be provided in an advantageous embodiment that the supporting ring of the bearing that is connected to the outer drum receives on the drive side of the outer drum the inner races of two anti-friction bearings. Between the races there is a gearwheel to drive the outer drum, which is rigidly connected to the supporting ring. Therefore, the supporting ring also serves to transfer the drive force. Finally it is also possible in an advantageous manner to bias the supporting ring by the force of the compression springs of the seal against an end flange of the outer drum and to design it in such a manner that it is connected to the end flange of the outer drum in the circumferential direction exclusively by means of cylindrical pins or the like extending parallel to the axis of the inner drum and the outer drum. This design offers the advantage that the supporting ring can be removed axially from the stationary drum along with the entire mounting. Therefore, the two sealing rings that make contact are not separated when the outer ring is disassembled. Since the sealing rings are not separated, it is not possible for flowable compound to become interposed between the sealing rings. Such compound would eventually harden and require a time consuming process to be removed.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2 is an enlarged longitudinal sectional view of the right mounting of the rotating outer drum on a stationary inner drum.

FIG. 3 is an enlarged longitudinal sectional view of the left mounting of the rotating outer drum on a stationary inner drum.

FIG. 4 is a sectional view taken along the line IV in FIG. 3.

DETAILED DESCRIPTION OF A PREFERRED EMBODIMENT OF THE INVENTION

Figure 1:
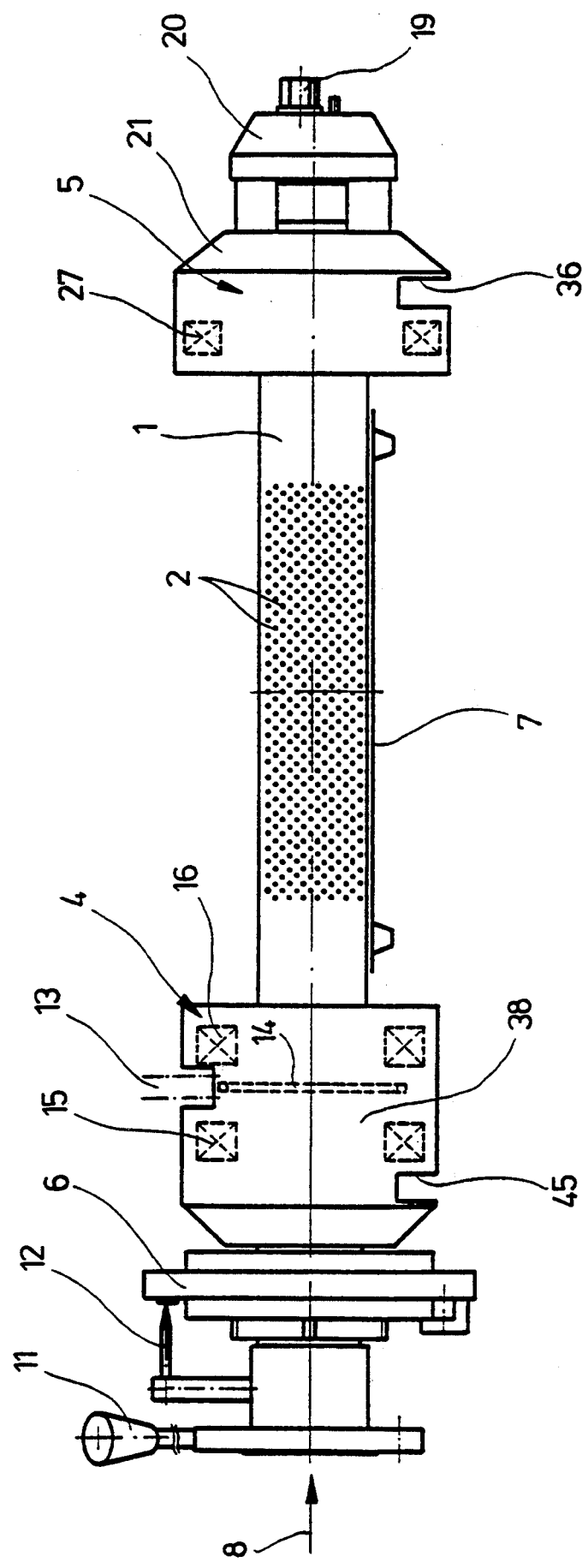
FIG. 1 is a schematic side elevational view of a device according to the invention that is disposed over a traveling cooling belt.

FIG. 1 is a diagrammatic view of a so-called rotoformer, which comprises in the well-known manner two cylindrical drums (1, 3) that rotate relative to each other. The outer one of the drums (1) has a central region provided with openings (2) of a specific diameter arranged over the entire circumference. This outer drum (1) is mounted rotatably on an inner hollow drum (3), which is shown in FIGS. 2 and 3, but not in FIG. 1. The outer drum (1) is mounted rotatably on the stationary inner drum (3) with the aid of two bearing arrangements (4 and 5), which are shown in FIGS. 2 and 3. The inner drum (3) is attached to a side bearing plate (6), which can be adjusted vertically in a conventional manner (not shown in detail) with respect to a continuous cooling belt (7) so that the outer drum (1) is placed at a specific distance from the cooling belt (7). The inner drum (3) can also be adjusted in a well-known manner to extend at a specific angle with respect to the bearing plate (6). The inner drum (3) exhibits, namely in the region of the rotatable outer drum (1), an outlet, directed exclusively downward, with a nozzle lip for discharging the free-flowing material to be dripped. That material enters the interior (9) of the inner drum (3) through the feed pipe (8) (see FIGS. 2 and 3). This material can leave through the nozzle lip (10) indicated diagrammatically in FIG. 3. The openings (2) arranged on the outer drum (1) become aligned cyclically with openings in the nozzle lip (10) when the outer drum (1) is rotated relative to the inner drum (3). At the same time the low viscosity material under pressure in the interior of the inner drum (3) drips down and falls either on the cooling belt (7) or is extracted through (i.e., pulled through) the openings due to contact with said cooling belt. The drip point can be adjusted by rotating the inner drum (3) relative to a vertical plane extending through the axis of the outer drum (1). This is done with the aid of the hand lever (11). The position of the inner drum is then displayed by way of a pointer (12) on a scale on the bearing plate (6).

The outer drum (1) is mounted rotatably on the inner drum (3) with the aid of the two bearing arrangements (4) and (5). The rotary drive for the outer drum (1) takes place by way of a chain (13), which interacts with a gearwheel (14), the details of which are apparent from FIG. 3 and which sits between two anti-friction bearings (15) and (16) of the bearing arrangement (4).

From FIG. 2 it is apparent that the inner cavity of the inner drum (3) receives a screw (17), which extends coaxially through the inner drum to assemble the drum (3) to the bearing plate (6), and which also has a threaded stem (18) which projects beyond the end face of the drum (3). The stem is provided with a nut (19) and a cap (20) which presses against the shank (21a) of a bell (21), to rigidly connect the bell (21) to the inner drum (3). The bell (21) has an external ring or race (21b), in which an outer ring (22a) of the anti-friction bearing (22) sits. The outer ring or race (22a) is secured by a ring (24), which revolves in the ring (21b) and which is held by means of a retaining ring. The ring (24) exhibits a radial feed opening (25) for enabling the anti-friction bearing (22) to be lubricated.

The inner ring (22b) of the anti-friction bearing (22) is pressed on a ring (26), which in turn is connected by means of a radial pin (27) to a supporting ring (28) so as to be non-rotatable relative to the ring (28). On the side of the ring (28) facing the rotating outer drum (1) the ring (28) receives a flange (29) which is welded on the outer drum (1). On its other side the ring (28) is provided with a sealing ring (30), which revolves with said flange (28) and which can be made of various materials, e.g., graphite. The supporting ring (28) is connected to the flange (29) by means of one or more axial retaining pins (31) so as to be non-rotatable relative to the flange (29). The sealing ring (30) interacts with a sealing ring (32), which can be slid axially in a groove (33) formed in the inner radial front wall of the bell (21). The ring (32) is pressed against the ring (30) by means of a row or stack of compression springs (34).

Thus, the bell (21) forms in the region of the seal (30, 32) an annulus (35), which is provided with a downwardly directed opening (36), the significance of which shall be explained later. As shown in FIG. 2, the opening (36) extends downward starting from the base of the groove (33).

The construction of the bearing arrangement (4) is similar to the bearing arrangement (5). Here, too, a bell (38) is connected to the inner drum (3) by means of a radial pin (37) so as to be non-rotatable relative to the drum (3). This bell (38) has an axially moveable sealing ring (39), which is pressed against a sealing ring (41) with the aid of compression springs (40). This sealing ring (41), which can be made of various materials such as graphite, rests against the side of the supporting ring (42) which faces away from the rotating outer drum (1). The supporting ring (42) is connected by means of one or more axial pins (43) to the flange (44), which flange is welded to the outer drum (1). Thus, the ring (42) is non-rotatable relative to the flange (44). The only difference between this bearing arrangement (4) over the bearing arrangement (5) is that the two anti-friction bearings (15 and 16) sit on the supporting ring (42). The outer rings of said bearings are arranged in the stationary bell (38), whereas the inner rings bear against the supporting ring (42). Disposed axially between the two anti-friction bearings is the gearwheel (14); which drives the outer drum (1) by way of the chain (13).

As is apparent from FIG. 4, the bell (38) also has in the region of the seal (39, 41) a downwardly directed opening (45), whose side wall facing away from the outer drum (1) starts from the base of a groove (46) which receives the sealing ring (39).

The design shown in FIGS. 1 to 4 exhibits the advantage that any material that flows into the space between the inner drum (3) and the outer drum (1), then flows axially past the supporting rings (28) or (42), and then passes radially outwardly through the respective sealing arrangement (30, 32) or (39, 41), can emerge through the downwardly directed opening (36 or 45) without the risk of such material flowing into the anti-friction bearings (22) or (15). It has been demonstrated that the stationary arrangement of the bell (21) or (38) exhibits the advantage that the bearing arrangement is quite safe and reliable, because only stationary parts are exposed at the ends of the rotoformer. Both the outer ring (21b) and the outer ring (38b) are stationary. The openings (36) and (45) that are open at the bottom and arranged in these stationary parts prevent in a simple manner the impairment of the bearing arrangement.

As is apparent from the view of FIG. 2 without any additional explanation, when a rotoformer according to the invention is to be serviced after detaching the nut (19) and cap (20), the bell (21) together with the bearing (5) can be axially removed as a unit from the inner drum (3) (i.e., slid to the right in FIG. 2). In so doing, the bearing (22) pushes against a lip (50) of the supporting ring (28) to cause the ring (28) to slide off the pins (31) and also be removed as a unit with the parts (21, 5). Thus, the seal comprising the two rings (30) and (32) is not separated even during disassembly of the apparatus. Contamination of the area between the sealing rings, is therefore reliably avoided. Similarly, the bell (38) can be removed, whereby here, too, the entire arrangement with the supporting ring (42) can he removed axially from the flange of the outer drum (1).

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for producing granulate from meltable compounds, comprising
   a stationary inner drum supported at least at one end and having an inner cavity for receiving melted compound, said inner drum having an outer periphery formed with at least one row of downwardly directed first openings communicating with said cavity,
   a rotatable outer drum disposed coaxially on said outer periphery and including second openings which are cyclically aligned with said first openings for enabling melted compound to drip from said apparatus,
   bearing/sealing assemblies disposed at respective ends of said inner drum and each comprising:
   a bell affixed to said inner drum and including an axially extending wall spaced radially outwardly from said inner drum to form a space therebetween,
   a supporting ring disposed in said space and arranged coaxially relative to said inner drum, said supporting ring being operatively connected to said outer drum for rotation therewith,
   anti-friction bearing means disposed within said space and positioned radially outside of said supporting ring, said bearing means including inner and outer bearing rings arranged co-axially with respect to said drum, said outer bearing ring being mounted to said wall, and said inner bearing ring being mounted on said supporting ring for rotation therewith,
   a portion of said space defining an annulus extending circumferentially around said inner drum and communicating with said bearing means, and
   sealing means including axially opposing sealing faces engaging one another to form a seal extending circumferentially around said inner drum at a location disposed radially between said inner drum and said annulus,
   a lower portion of said annulus communicating with a downwardly directed outlet opening for discharging particles that have leaked past said sealing faces to prevent such particles from fouling said bearing means.

2. Apparatus according to claim 1, wherein said supporting ring and said bell include axially opposing surfaces, said sealing means comprising first and second sealing rings disposed in respective ones of said surfaces, and spring means biasing said sealing rings axially into mutual contact.

3. Apparatus according to claim 2, wherein said spring means is disposed within a recess formed in said bell.

4. Apparatus according to claim 1, wherein one of said bearing/sealing assemblies includes a gear operably connected to said supporting ring for rotation therewith and being accessible to be driven through an opening provided in said wall.

5. Apparatus according to claim 4, wherein said bearing means of said one assembly comprises an additional set of inner and outer bearing rings spaced axially from said first-named inner and outer bearing rings to form an axial gap therebetween, said gear being disposed in said gap.

6. Apparatus according to claim 1, wherein said bell, said supporting ring, said bearing means, and said sealing means are arranged for axial outward movement with respect to said inner and outer drums.

7. Apparatus according to claim 1, wherein said outer drum includes a radial flange at each end thereof, each of said supporting rings being connected to a respective one of said flanges by an axially extending pin enabling said supporting ring to be disconnected in an axially outward direction from said outer drum.

8. Apparatus according to claim 7 including spring means disposed in each bell for biasing said sealing faces against one another and biasing said sealing ring toward its respective flange.

* * * * *